Patented Dec. 26, 1933

UNITED STATES PATENT OFFICE 1,940,817

RUBBER COMPOSITION AND METHOD OF PRESERVING RUBBER

Waldo L. Semon, Cuyahoga Falls, Ohio, assignor to The B. F. Goodrich Company, New York, N. Y., a corporation of New York No Drawing. Application July 16, 1929
Serial No. 378,812

20 Claims. (Cl. 18—50)

This invention relates to the art of preserving rubber, either in the vulcanized or unvulcanized condition, and to rubber compositions so preserved.

It is well known that rubber is subject to more or less rapid deterioration upon aging, especially when exposed to light, heat, or air. It has been proposed to treat rubber with so-called "anti-oxidants" or age-resisters for the purpose of retarding its deterioration and extending the period of its usefulness. Such previously known anti-oxidants include phenolic compounds, aromatic amino compounds, and the condensation products of aldehydes and amines.

This invention consists in treating rubber with a member of a new class of extremely effective anti-oxidants. This class comprises the addition products of certain non-accelerating organic amines with hydroxy derivatives of certain aromatic hydrocarbons, and particularly the addition products of primary or secondary amines with hydroxy derivatives of substances containing at least two aromatic rings. Such products are readily prepared by combining the amine and the hydroxy compound, preferably in equimolecular proportions or in multiples thereof, by any appropriate method, such as by melting the two constituents together, or by dissolving them separately in an appropriate solvent, mixing the solutions and eliminating the solvent. The addition products, however, should not be confused with the condensation products made from the same raw materials with the elimination of water. The addition products, although they appear to be stable molecular compounds of definite composition, contain all the elements of the constituents, and resemble inorganic salts in that they are more or less readily dissociated into their constituents, in marked contradistinction to the condensation products, which possess fewer atoms than the raw materials, and are comparatively inert and unreactive, not permitting a separation into the two original constituents. It is to be understood, however, that it is not intended to limit this invention by any theories which may herein be advanced by way of explanation or illustration, but that it is intended that the term "addition products" include generally all products obtained by combining phenols with amines without the elimination of water.

The amines which constitute one of the components of the aforesaid addition products include both primary and secondary, aliphatic and aromatic amines. For example, such aliphatic amines as methylamine, dimethylamine, ethylene diamine, diethylamine, dibutylamine, benzylamine, dibenzylamine, diethanolamine, morpholine, piperidine, and piperazine; or such primary aromatic amines as aniline, toluidine, and naphthylamine; or secondary aromatic amines such as methylaniline, diphenylamine, phenyl-beta-naphthylamine, phenyl - alpha - naphthylamine, phenyl-p-toluidine, phenyl-p-anisidine, ditolylamine, symmetrical diphenyl-p-phenylene-diamine, symmetrical di-beta-naphthyl-p-phenylene-diamine, dinaphthylamine, methyl-alpha-naphthylamine, butyl - alpha - naphthylamine, benzyl alpha naphthylamine, diphenyl-ethylene-diamine, ditolyl-ethylene-diamine, p-amino-diphenylamine, p - methylamino - diphenylamine, carbazole, and thiodiphenylamine; or even the aldehyde derivatives of primary amines, which exhibit the characteristic properties and reactions of secondary amines, such as aldol-alpha-naphthylamine, butyraldehyde-alpha-naphthyl-amine, acetaldehyde-p-aminodiphenylamine; or other primary or secondary amino compounds such as diphenylguanidine may be employed as the basic constituent of one of the above-mentioned anti-oxidant addition products.

The other ingredient, the phenolic compound, which is to be combined with one of the foregoing amines to form the addition product, is selected from the hydroxy derivatives of aromatic compounds containing at least two aromatic rings. For example, alpha or beta naphthol, dinaphthol, dihydroxy-naphthalene, hydroxy-anthracene, phenyl-phenol, dihydroxy-biphenyl, p-hydroxy-diphenylamine, dihydroxy-diphenylamine, p-hydroxy-diphenylmethane, dihydroxy-diphenylmethane, p,p'-dihydroxy-diphenyl-dimethyl-methane, p-hydroxy-N-phenyl-morpholine, etc. may be employed and give rise to products which are extremely valuable anti-oxidants. For convenience, such compounds will hereinafter be termed "phenols containing at least two aromatic rings".

The addition products prepared from non-accelerating amines and the above-mentioned hydroxy derivatives of aromatic compounds are themselves non-accelerators of vulcanization. This property is exceedingly important in the practical utilization of the anti-oxidants, since it permits the addition of such anti-oxidants ad libitum or permits changing the proportions employed in any rubber composition to conform to the requirements established by its particular use, without making necessary any change in the proportions of the various vulcanizing agents, accelerators, etc. or in the time or conditions of vulcanization. It is therefore preferred to employ addition products derived from non-accelerating amines, especially secondary aromatic amines, but the addition products derived from other amines are also very useful in cases in which the accelerating properties are not objectionable, or in cases in which it is desired to employ a single ingredient which functions both as an anti-oxidant and as an accelerator. The addition products are practically odorless and do not impart an undesirable odor to rubber compositions. Many of them possess the additional advantage that they show little or no tendency to discolor or stain the rubber, either before or after vulcanization.

Rubber or rubber compositions may be rendered extremely resistant to deterioration by incorporating therein a small proportion of one of the above-mentioned addition products, preferably in the proportion of from $\frac{1}{10}$ to 5 parts by weight being added to each 100 parts of rubber. Rubber so treated withstands oxidation or exposure to sunlight or the elements for a far longer period than similar untreated rubber, without sensible deterioration.

*Example 1.*—As a specific example of one embodiment of the method of this invention, a typical tire tread composition was prepared containing: blended plantation rubber 100 parts by weight, sulfur 5.5 parts, zinc oxide 30 parts, gas black 40 parts, mineral rubber 10 parts, palm oil 5 parts, and hexamethylene tetramine 0.75 parts. This was divided into five portions, one of which was used as a control. To the others were added 1.90 parts (1% of the weight of the composition) respectively of one of the following anti-oxidants, which were prepared by mixing the phenol and the amine in equivalent proportions so that each basic nitrogen reacted with and was neutralized by a phenolic hydroxyl group:

A. o-phenyl-phenol+dibutylamine
  B. p-phenyl-phenol+piperazine
  C. p-phenyl-phenol+aniline
  D. p-phenyl-phenol+diamino-diphenylmethane.

The compositions were thoroughly mixed, and vulcanized in a press for 45 minutes at 145° C. (290° F.) to produce an optimum cure, except the composition containing the product A, which was vulcanized for a somewhat shorter time because of the accelerating nature of the anti-oxidant. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. In the table below T indicates ultimate tensile strength in pounds per sq. in. and E indicates ultimate elongation in per cent. of original length.

*Aging tests of addition products*

| Anti-oxidant (1%) | Before aging | | After 7 days in the Geer oven | | After 48 hours in the Bierer-Davis bomb | |
|---|---|---|---|---|---|---|
| | T | E | T | E | T | E |
| None (control) | 3502 | 672 | 1636 | 419 | 807 | 290 |
| A | 3744 | 677 | 2306 | 507 | 1648 | 570 |
| B | 3704 | 633 | 2370 | 500 | 1656 | 514 |
| C | 3784 | 663 | 2388 | 530 | 1687 | 537 |
| D | 3610 | 650 | 2290 | 493 | 2041 | 523 |

It is evident that the composition containing the anti-oxidant retains its good physical properties to a far greater extent than the composition without anti-oxidant, even after a very severe artificial aging test.

*Example 2.*—A number of anti-oxidants were prepared by combining beta-naphthol with amines in equivalent proportions as follows:

E. Beta-naphthol+diethanolamine
  F. Beta-naphthol+dibutylamine
  G. Beta-naphthol+piperidine
  H. Beta-naphthol+piperazine
  J. Beta-naphthol+diphenylamine These anti-oxidants were tested in the manner indicated in Example 1 above, except that only 0.95 parts (0.5%) of the anti-oxidant were employed, the composition containing the product G again being vulcanized a somewhat shorter time than the others. The results are reported in the following table:

*Aging tests of addition products*

| Anti-oxidant (0.5%) | Before aging | | After 7 days in the Geer oven | | After 48 hours in the Bierer-Davis bomb | |
|---|---|---|---|---|---|---|
| | T | E | T | E | T | E |
| None (control) | 3520 | 650 | 1789 | 434 | 743 | 303 |
| E | 3488 | 647 | 2052 | 487 | 1266 | 467 |
| F | 3522 | 677 | 2197 | 550 | 1000 | 473 |
| G | 2463 | 637 | 2204 | 507 | 1389 | 483 |
| H | 3478 | 697 | 2278 | 547 | 3045 | 613 |
| J | 3686 | 667 | 2680 | 567 | 2738 | 577 |

From these examples it is evident that the addition products of phenols and non-accelerating amines are extremely effective in retarding the deleterious action normally incident to the aging of rubber.

Obviously, the practice of this invention is not limited to the specific compositions given above, such compositions being merely illustrative of one manner of employing the anti-oxidants of this invention. The proportions of the constituents may be varied, or other substances may be substituted therefor, since this invention is applicable to pure rubber or rubber compositions of the most varied nature. The anti-oxidants may also be applied to unvulcanized or vulcanized rubber with good effect on the age-resisting properties of the rubber, such as by applying them to the surface of the rubber, as for example in solution, or in the form of a paste or emulsion.

The addition products disclosed herein of phenols containing two discrete aromatic rings, such as phenyl phenols, with amines are claimed as antioxidants in rubber in my copending application Serial No. 672,226 filed May 22, 1933.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether or not admixed with fillers, pigments, vulcanizing or accelerating agents. The term "aryl" is herein employed to designate aromatic radicals, such as phenyl or tolyl, whose free valence belongs to the aromatic nucleus and not to a side chain, and therefore excludes the benzyl radical.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with the addition product of beta-naphthol and diphenylamine.

2. The method of preserving rubber which comprises treating rubber with the addition product of a phenol containing at least two aromatic rings and a diaryl substituted amine in which the aryl groups belong to the benzene homologous series.

3. The method of preserving rubber which comprises treating rubber with the addition product of a phenol containing at least two aromatic rings and a phenyl-arylamine in which the aryl group belongs to the benzene homologous series.

4. The method of preserving rubber which comprises treating rubber with the addition product of a phenol containing at least two aromatic rings and diphenylamine.

5. The method of preserving rubber which comprises treating rubber with the addition product of a naphthol and a diaryl substituted amine in which the aryl groups belong to the benzene homologous series.

6. The method of preserving rubber which comprises vulcanizing a rubber composition comprising a vulcanizing agent, an active organic accelerator, and the addition product of a phenol containing at least two aromatic rings and a diaryl substituted amine in which the aryl groups belong to the benzene homologous series.

7. The method of preserving rubber which comprises vulcanizing a rubber composition comprising a vulcanizing agent, an active organic accelerator, and the addition product of a naphthol and a phenyl-arylamine in which the aryl group belongs to the benzene homologous series.

8. A composition of matter comprising rubber and the addition product of a phenol containing at least two aromatic amines and a diaryl substituted amine in which the aryl groups belong to the benzene homologous series.

9. A composition of matter comprising rubber and the addition product of a phenol containing at least two aromatic rings and a phenyl-arylamine in which the aryl groups belongs to the benzene homologous series.

10. A composition of matter comprising rubber and the addition product of a phenol containing at least two aromatic rings and diphenylamine.

11. A composition of matter comprising rubber and the addition of a naphthol and a diaryl substituted amine in which the aryl groups belong to the benzene homologous series.

12. A composition of matter comprising rubber and the addition product of beta-naphthol and diphenylamine.

13. The method of preserving rubber which comprises treating rubber with the addition product of a phenol containing at least two aromatic rings and a diarylamine in which at least one aryl group contains an alkyl substituent.

14. The method of preserving rubber which comprises treating rubber with the addition product of a naphthol and a tolyl aryl amine.

15. The method of preserving rubber which comprises treating rubber with the addition product of a naphthol and a phenyl tolyl amine.

16. The method of preserving rubber which comprises treating rubber with the addition product of a naphthol and ditolyl amine.

17. A composition of matter comprising rubber and the addition product of a phenol containing at least two aromatic rings and a diarylamine in which at least one aryl group contains an alkyl substituent.

18. A composition of matter comprising rubber and the addition product of a naphthol and a tolyl aryl amine.

19. A composition of matter comprising rubber and the addition product of a naphthol and phenyl tolyl amine.

20. A composition of matter comprising rubber and the addition product of a naphthol and ditolyl amine.

WALDO L. SEMON.